United States Patent [19]

Lin

[11] 4,012,781
[45] Mar. 15, 1977

[54] MAGNETORESISTIVE READ HEAD ASSEMBLY FOR SERVO OPERATION

[75] Inventor: Charles Chia-Hsiung Lin, San Jose, Calif.

[73] Assignee: International Business Machines Corporation, Armonk, N.Y.

[22] Filed: Aug. 14, 1975

[21] Appl. No.: 604,693

[52] U.S. Cl. .................................. 360/113; 324/46; 360/75
[51] Int. Cl.² ...................... G11B 5/30; G11B 5/22; G11B 21/10
[58] Field of Search .............. 360/113, 77, 75, 123, 360/125, 66; 338/32; 324/46

[56] References Cited
UNITED STATES PATENTS

| | | |
|---|---|---|
| 3,493,694 | 2/1970 | Hunt .................................. 360/113 |
| 3,860,965 | 1/1975 | Voegeli ............................. 360/113 |
| 3,864,751 | 2/1975 | Beaulieu et al. ................... 360/113 |
| 3,879,760 | 4/1975 | Lazzari .............................. 360/113 |
| 3,918,091 | 11/1975 | Walraven et al. ................. 360/113 |

Primary Examiner—Alfred H. Eddleman
Attorney, Agent, or Firm—James A. Pershon

[57] ABSTRACT

A transducer for servoing on data or separate servo information is fabricated with two adjacent magnetoresistive (MR) elements stagger connected such that each MR element senses one-half of the data magnetic transition track or separate coded servo tracks. Each MR element is magnetostatically biased by a soft magnetic film formed as a portion of its adjacent MR element material.

9 Claims, 7 Drawing Figures

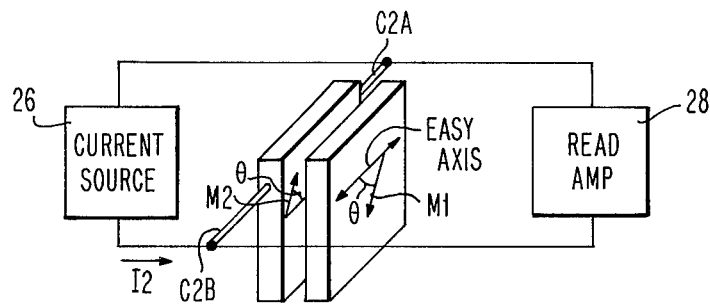
FIG.3
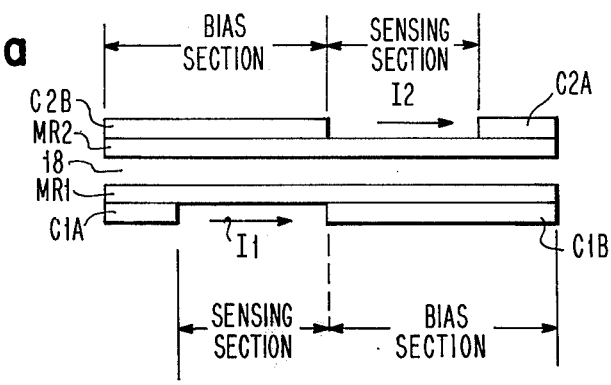
FIG.4a
FIG.4b
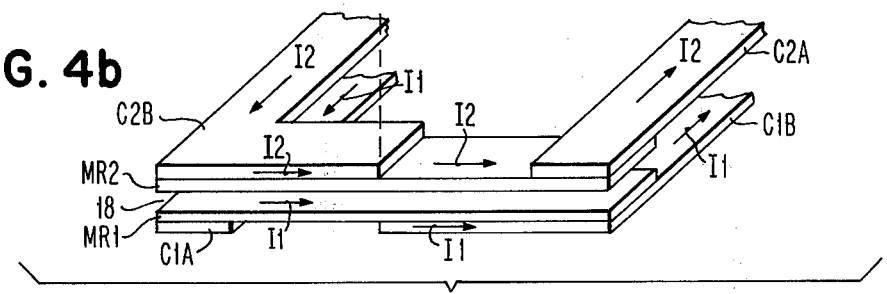
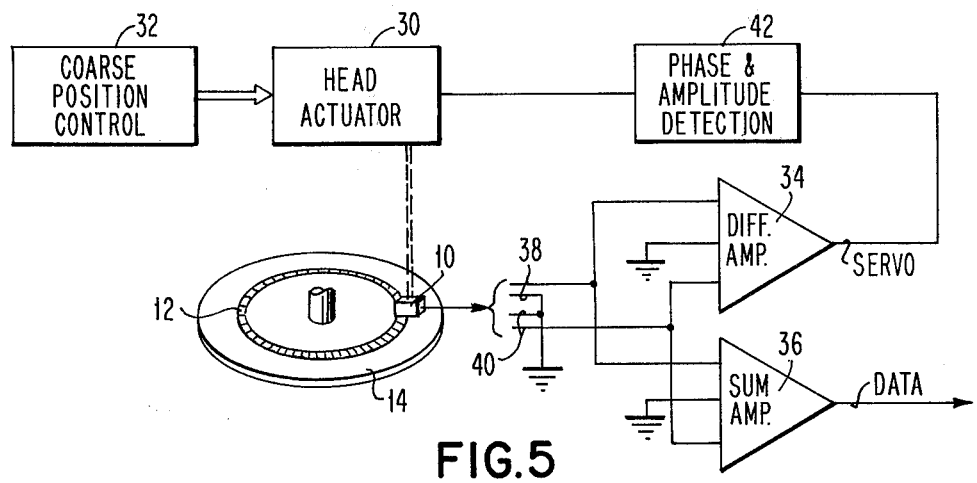
FIG.5

MAGNETORESISTIVE READ HEAD ASSEMBLY FOR SERVO OPERATION

BACKGROUND OF THE INVENTION

This invention relates generally to a transducer that includes an element exhibiting a magnetoresistive effect for the detection of magnetic flux and more specifically to a transducer including magnetoresistive elements used for providing servoing information from the detection of magnetic flux transitions.

FIELD OF THE INVENTION

It is highly desirable to use magnetoresistive (MR) elements in head assemblies for sensing recorded data. MR heads are thin and afford a savings in space and are adaptable to batch fabrication. Furthermore, the signal output of the MR element is substantially larger than that experienced with an inductive read transducer. Sensing transducers using MR elements have been developed and used to sense magnetic flux from a moving magnetic media such as tapes or disks and to sense magnetic bubble domains.

Storage devices using a track of magnetic flux transitions are commonly used in present day data processing systems. The data information in the form of a magnetic flux is sensed from the magnetic media by properly positioning a transducer (read/write head) directly over the track. In order to maintain the head in proper position over the data track, a track following servo system is generally incorporated into the head positioning mechanism.

Description of the Prior Art

The prior art head positioning systems received their positioning information from either special servo signals built into the magnetic media along the data track with which registration is to be maintained or used the data track itself as a servo signal to position the heads. The special servo signal tracks used various means such as special flux transitions, separate servo information layers, phase discrimination apparatus and special servo frequencies to signal and reposition the head positioning systems.

Prior art servo positioning systems such as U.S. Pat. No. 3,246,307 issued to C. D. Stanley and assigned to the assignee of the present invention disclosed a servo positioning system which utilized the data tracks in a dual role. The date tracks provided the data information and a source of servo information for controlling the positioning of one or more transducer which magnetically cooperated with the data tracks. This approach eliminated the need for separate servo tracks on a data disk, while still retaining the advantages of a servo positioning system to permit accurate positioning of one or more transducers relative to the closely spaced data tracks.

Further, prior art servo positioning systems used separate read transducers. The separate transducers were positioned a distance apart to lessen interference, with the edge of each gap precisely aligned to essentially eliminate a dead band. A dead band is the section between the two read transducers which does not sense the magnetic flux transitions. The dead band prevents positive centering over the data track since the actual sensor center is not sensed. The servo error is at least equal to the width of the dead band. The dead band in the prior art transducers is relatively small compared to the width of the magnetic flux sensed by a transducer but the dual transducers are difficult to manufacture. However, using one MR element for the sensing transducers, the width of the center conductor to the separate MR elements cannot be disregarded compared to the track width. Thus if one center tapped MR element is used for producing servo signals, the center conductor will produce an intolerable dead band for high track density recording system.

It is, therefore, an object of the present invention to provide an MR element sensing transducer usable for servo positioning systems that eliminates the dead band center area.

Further, the problem still remains to provide a means for biasing the MR elements into their operating region. Without the present invention, extra layers of biasing material must be provided such as a soft magnetic bias film as disclosed and taught by Beaulieu et al. in U.S. Pat. No. 3,864,751, assigned to the same assignee as the present invention.

It is, therefore, another object of the present invention to provide a servo operated magnetic read head assembly which provides a soft magnetic bias for the magnetoresistive elements without requiring a separate bias film.

A head assembly including two MR elements that are magnetostatically coupled is disclosed in U.S. Pat. No. 3,860,965, issued to O. Voegeli and assigned to the assignee of the present invention. That patent provided matched MR elements connected for overcoming thermal noise by common mode rejection. The drive current served as the sense current through a given element and also as the bias current for the other element. But the patent does not show a head assembly which is specifically connected for improved servo sensing while including an adjacent MR element section unused for sensing magnetic flux transitions. Each element provides a magnetic bias field and a magnetic keeper for retaining the magnetic bias field.

Another object, therefore, is to provide a head assembly having two MR elements each connected for servo control while providing a soft magnetic bias and keeper layer for each other element.

SUMMARY OF THE INVENTION

In accordance with the present invention, a magnetoresistive transducer head assembly for use with a servo positioning system incorporates a plurality of MR elements of approximately similar dimensions. Each element includes a sensing section defined by conductors and a biasing section magnetostatically coupled to a sensing section of an adjacent element. Each MR element is electrically insulated from each other by an insulating material disposed therebetween.

The conductors apply a drive current to the sensing section of each element. The first conductor defines one end of the sensing section while the second conductor is positioned on the outer edge of a dividing line defining the centerline of the magnetic flux transitions sensed by one element and its adjacent element. The current through the conductors induces a magnetic field in its sensing section to magnetically bias a biasing section of its adjacent element. The adjacent biasing section in turn produces a back magnetic field that is applied to the inducing sensing section as a linear biasing field. The magnitude of the biasing field is a function of the drive current magnitude.

In accordance with the preferred embodiment, a magnetoresistive transducer head assembly for use with a servo positioning system incorporates two MR elements of approximately the same dimensions. One conductor lead is connected to each MR element at opposite ends of the elements. Second conductor leads are stagger connected to each MR element such that the active sensing area of each MR element is essentially the same dimension. The second or center conductors are connected to its element with its center facing edge meeting at a plane such that the magnetic flux transitions of interest are sensed. Drive current applied to the interconnected section of the MR element serves as a sense current through the given element portion and also for inducing a magnetic field in the section of the MR material stripe adjacent thereto. The adjacent section of the MR stripe is not used for sensing magnetic flux transitions but rather provides the magnetic field which biases the sensing MR element. Thus each MR element has a section connected for sensing one half of the magnetic flux transitions for data and servoing operation while the remaining portion has a magnetic field induced therein to bias a magnetostatically coupled MR element similarly driven.

An object of the present invention, therefore, is to provide an enhanced head assembly using magnetoresistive elements.

Another object of this invention is to provide a pair of magnetoresistive elements stagger connected for improved servo positioning operation.

Yet another object is to provide a servo sensing head assembly having magnetoresistive elements that are magnetostatically coupled and which provide a magnetostatic bias for its paired magnetoresistive element.

A second embodiment places one conductor leg over the entire biasing section of the MR material. The other conductor is placed on the opposite end. The sense current thus becomes the bias current. Current bias is provided together with magnetostatic coupling thereby reducing the current necessary through the element.

It is another object to provide a servo sensing MR element head assembly that provides current bias together with magnetostatic coupling.

Still another object is to provide a staggered connected magnetoresistive element head assembly that can provide a servo signal from data magnetic flux transitions.

These and other objects of the present invention will become apparent to those skilled in the art as the description proceeds.

BRIEF DESCRIPTION OF THE DRAWINGS

The various novel features of this invention along with the foregoing and other objects, as well as the invention itself both as to its organization and method of operation, may be fully understood from the following description of illustrated embodiments when read in conjunction with the accompanying drawing, wherein:

FIG. 2b is a simplified isometric view of the elements shown in FIG. 2a;

FIG. 3 is a representational block diagram of one MR element with the adjacent MR element providing the soft magnetic bias;

FIGS. 4a and 4b are a simplified bottom sectional and isometric views of another embodiment of the present invention; and FIG. 5 is a block diagram of a system embodying the head assembly according to the present invention.

DESCRIPTION OF THE PREFERRED EMBODIMENTS

With reference to the drawings and particularly to FIG. 5, there is illustrated a magnetic head assembly 10 for sensing magnetic flux transitions 12 recorded on a track of a magnetic disk 14 moving relatively to the head assembly 10. It is apparent that the track may be associated with a magnetic tape or other magnetic media or that the data information can be represented by propagating magnetic bubble domains. The head assembly 10 is used to servo, that is, to be positioned according to its sensing of the flux transition 12 as will be described according to the preferred embodiments of the present invention.

Figure 1:
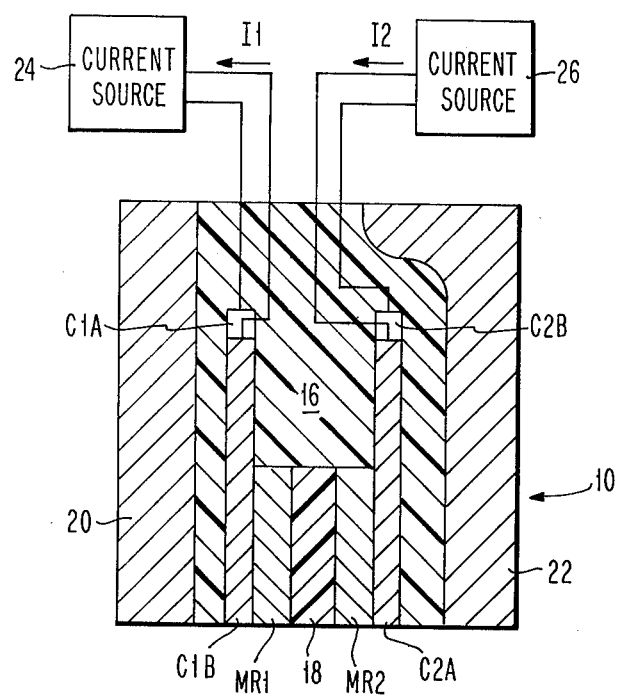
FIG. 1 is a cross section of a preferred embodiment of the magnetic read head according to the present invention.

In practice, referring to FIG. 1, the head assembly 10 is fabricated as a multilayer thin film assembly using conventional vapor deposition, electroplating and photolithographic techniques. The head assembly 10 comprises magnetoresistive (MR) elements MR1 and MR2 that are magnetostatically coupled to one another. The MR element may be formed as thin ferromagnetic films parallel to one another. The elements MR1 and MR2 have uniaxial anisotropy and a high magnetoresistance coefficient. The MR elements are matched to each other and have substantially the same thickness, dimensions, resistivity and shape anisotropy. Each MR element receives current from a constant current source applied through conductors. Accordingly, the MR1 element receives current I1 from a current source 24 via conductors C1A and C1B (see FIG. 2). The MR2 element receives current I2 from a current source 26 via conductors C2A and C2B.

The MR1 and MR2 elements are separated by an insulating layer 18. The thin insulating layer 18 should be thick enough to break the magnetic exchange coupling between the elements while electrically isolating one element from the other. The insulation can be silicon monoxide, silicon dioxide, aluminum oxide or other insulating materials. Further, an insulating material 16 supports and insulates the conductor and element assemblage from magnetic shield 20 and 22. The MR elements may be formed of a Permalloy composition comprising, for example, 80% nickel and 20% iron. In this embodiment, the easy axis of magnetization of both MR elements are in the track-width direction as shown in FIG. 2. Magnetic layers 20 and 22 are deposited as the magnetic shields for the MR elements to minimize the effect of stray magnetic flux which would decrease the magnetic resolution of the readback signal. Ther interconnection of the conductors to the MR elements is more clearly shown in FIG. 2 for the first embodiment.

Figure 2A:
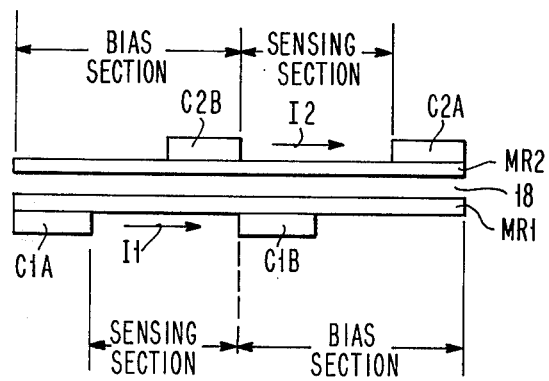
FIG. 2a is a simplified bottom sectional view of the head assembly of FIG. 1.
Figure 2B:
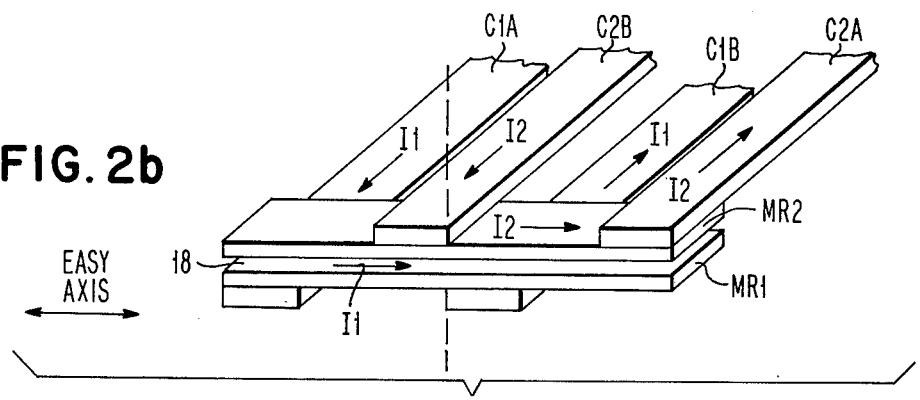

Referring to FIG. 2a, the conductor C1A carrying current I1, is connected at one end of the MR1 element. The return current conductor C1B for the MR1 element is located on the outside edge of the MR1 element sensing section. Herein, the sensing section of the MR elements is that portion that will produce an output signal by reacting to magnetic flux transitions.

Conductors C2A and C2B are similarly connected to the MR2 element to define the remaining sensing section of the magnetic flux transitions sensed by the head assembly. Conductors C1B and C2B are essentially positioned on the outer edge of the center dividing line representing the center of the magnetic flux transitions of the track or the boundary of the tracks to be read.

The interaction of the elements is illustrated schematically in FIG. 3, where M1 is the magnetization of the bias film of MR1 which produces a magnetic field acting on the MR2 element. M2 is the magnetization of the sensing MR element. It is biased by the field generated be M1 to an angle $\theta$ from its easy axis. FIG. 3 represents the right portion of the head assembly shown in FIG. 2. In FIG. 3 the sensing section of the MR2 element is shown together with the bias section of the MR1 element. Conductors C2A and C2B connect the MR2 element to the current source 26 and a read amplifier 28.

As the sense current I2 generated by the current source 26 flows into conductor C2B through the MR2 element and conductor C2A, it generates a magnetic filed that is impressed upon the MR1 element. The magnetic field rotates the magnetization in the MR1 element to an angle $\theta$ of approximately 45°. This magnetization thus establishes a proper bias through magnetostatic coupling for the MR2 element for sensing magnetic flux transitions. As shown in FIG. 2, the MR2 element would sense the right portion of the magnetic flux.

Similarly, the MR1 element can sense the left portion of the magnetic flux transition. The MR1 element is operated in the same way as just described for the MR2 element. The sense current I1 through the MR1 element sets up a magnetization field in the bias section of the MR2 element which in turn provides a stray magnetic field which rotates the magnetization of the sensing section of the MR1 film to an angle $\theta$ thereby establishing a proper bias for the MR1 element. The MR1 element senses the magnetic flux to the left of center of the head assembly.

A second embodiment according to the present invention is illustrated in FIG. 4. The head assembly in FIG. 4 utilizes current bias to provide a magnetic bias for a MR element. The MR elements MR1 and MR2 are again constructed having similar dimensions and operate in a similar manner except for the method of establishing a bias condition as previously discussed for FIG. 2. Referring to FIG. 4, conductors C1A and C2A are each respectively fastened to one end of its associated MR element. Conductors C1B and C2B in the embodiment of FIG. 4 entirely overlap the bias section of the MR element of FIG. 2. By overlapping the MR material, this portion of the MR element will not sense the magnetic flux transitions.

In the embodiment shown in FIG. 4, the current flowing through the bias section of the conductor provides the operational bias for the section of the associated MR sensing element placed adjacent that conductor. For instance, the operational bias for the MR1 element in FIG. 4 is provided by the current I2 generated by a current source (not shown) and flowing through conductor C2B, MR2 and conductor C2A. Current I2, while flowing through the bias section of conductor C2B, see FIG. 4A, sets up a magnetic field which will induce a magnetic field to the sensing section of the MR1 element thereby biasing the MR1 element into the linear operation. Similarly current I1 directed through conductor C1A, the MR1 element and conductor C1B provides a magnetic field which provides the magnetic bias for the MR2 element.

One advantage of forming the MR elements with both sensing section and bias section according to this embodiment is that both current bias and magnetostatic coupling can be used to bias a sensing section of the MR element. As the current I1 and I2 are applied to the head assembly, the magnetic field encountered by the MR film of the bias section is zero because the magnetic fields generated by I1 and I2 are equal in amplitude but opposite in polarity. Therefore the magnetization of the MR element bias section is free to respond to the stray field from the MR sensing section. It thus provides an effective magnetic keeper for its associated MR element sensing section. This will greatly reduce the demagnetization effect, which in turn, reduces the bias current necessary for establishing a proper bias condition for magnetoresistive operation. The disadvantage of the large current necessary for pure current bias is overcome. In the present embodiment the current bias and magnetostatic biasing schemes are combined to provide an operational servo MR element head assembly. This structure does not add any additional processing step in fabrication because a separate biasing layer is not required. The mask forming the MR elements need only be extended to provide essentially similar element dimensions.

A head assembly according to the present invention could be used to provide a servo signal from magnetic flux transitions representing dat or servo information or from a dual layer media wherein the data information is represented on one layer of media and the servo information is represented on a second layer of the media. The frequency of the servo information is predetermined for most favorable conditions. It can be the same as the frequency of the data information, though it is usually chosen to be a different frequency. The insulation layer 18 thickness is relatively insignificant and thereby does not affect the sensing of the magnetic flux transitions representing the data information. The lag represented by the difference in the sensing regions of the MR elements will not produce significant error. A block diagram is illustrated in FIG. 5 showing a possible system wherein the head assembly according to the present invention can be used to provide servo information and data signals both from the data track.

Referring to FIG. 5, the head assembly 10 is shown positioned over the data track 12 of the disk media 14. In general, the disk is rotating at a constant speed to provide relative motion between the flux transitions of the track 12 and the head assembly 10. The head assembly 10 is movable to position the head assembly adjacent to any selected one of many data tracks provided in the disk 14. The head assembly 10 may be positioned by a suitable means represented by a head actuator 30. The head actuator 30 can represent a voice coil motor interconnected to the head assembly 10 by a positioning arm. A coarse position control 32 provides the signal to the head actuator 30 to place the head assembly 10 into an approximate position relative to the desired track. The fine positioning is provided by the servo signal directed to the head actuator 30.

The servo signal and the data signal can be separated by a differential amplifier 34 and a summing amplifier 36. The leads of cable 38 can be connected to the MR1 element for example, with the leads of cable 40 connected to the MR2 element of the head assembly 10.

One lead from the cables 38 and 40 is directed to a common or ground terminal. The other lead of each cable is directed to both the differential amplifier 34 and the summation amplifier 36.

The output of the differential amplifier is directed to a phase and amplitude detection circuit 42 where the difference output is detected for negative and positive difference from one signal input relative to the other. For instance, a correct positioning can be accomplished when a servo signal is equal to zero. A move right signal can be represented by a positive output from the differential amplifier 34 and the phase and amplitude detection circuit 42 and a move left can be represented by a negative output. Thus, according to the present invention, two MR elements can be stagger connected to provide a servo information and data sensing. Further, no separate bias layers are required to place the MR elements into the correct bias condition. The magnetic bias for the sensing sections of the MR elements is provided by a section of the other MR element and the associated conductors. Thus, the staggering of the sensing sections of two MR elements for servo operation together with the ease and convenience of the formation of the assembly without separate bias layers provides the heart of the present invention.

A typical head assembly according to the present invention has an element thickness of both MR1 and MR2 of from 200-600 angstroms. The MR elements may be formed of a Permalloy material which is vapor deposited. The insulating layer 18 between the MR elements may be made of silicon dioxide and may have a thickness of appoximately 2,000 angstroms. Further in FIG. 1, the conductors can be made of gold or copper for example, to a thickness of approximately 1500 angstroms. The shields 20 and 22 can be formed from a Permalloy or ferrite material. A typical ferrite shield is on the order of 5.0 millimeters thick. The insulation 16 deposited around the conductors, the shields and the MR elements can be also formed from silicon dioxide, the purpose being to provide electrical insulation between the separate layers.

The principles of the present invention have now been made clear in an illustrated embodiment. There will be immediately obvious to those skilled in the art many modifications of structure, arrangements, proportions, the elements, materials and components used in the practice of the invention. For instance, a head assembly according to the present invention can be used only to sense magnetic flux transitions identifying only servo information signals as well as providing servo signals while also reading data.

Further, although two MR elements are shown in the preferred embodiment, it should be evident that more elements could be used, with each perhaps sensing its share of the track. Adjacent conductors would be placed on the outer edge of the dividing line defining the centerline of the magnetic flux transitions sensed by the adjacent elements. For example, three or four elements could be used, with the center MR elements or elements sensing section used to retrieve the data information from the track, and the outer two used to provide the servo information. Adjacent elements would still provide the bias field for each other. The elements could all have similar dimensions, or a pair of elements could be placed side by side providing a bias field for each other and could be of essentially similar size. The appended claims are therefore intended to cover and embrace any such modification within the limits only of the true spirit and scope of the invention.

What is claimed is:

1. A head assembly for sensing magnetically recorded information from a medium and operable to provide servo information, said assembly comprising:
    a plurality of magnetoresistive elements spaced from each other with each sensing a different portion of the same magnetic recorded information;
    a first conductor means electrically connected to each element at alternating ends;
    a second conductor means electrically connected to each element such that the outer edge of each second conductor means is on a dividing line defining the centerline or the track boundary of the magnetic flux transitions sensed by one element and its adjacent element such that essentially no dead band remains therebetween;
    means for applying a current to each of said first and second conductor means; and
    biasing means for providing a magnetic operating bias for said elements at least between said first and second conductor means for sensing the magnetically recorded information.

2. A head assembly as defined in claim 1 wherein said plurality of magnetoresistive elements comprise a pair of elements with one portion of each element being a sensing section and one portion being a biasing section.

3. A head assembly as defined in claim 2 wherein one first conductor means is connected to alternate ends of each of said pair of elements and one second conductor means is connected to the approximate center of each element with the outer edge of both second conductors positioned on a dividing line representing the centerline of the elements.

4. A head assembly as defined in claim 2 wherein one first conductor means is connected to alternate ends of each of said pair of elements and one second conductor means is connected to an opposite end of each of said pair of elements and covers the biasing section of its element such that the inner edge of each second conductor is positioned on a dividing line representing the centerline of the elements.

5. A head assembly for sensing a track of magnetically recorded information from a medium and operable to provide servo information, said assembly comprising:
    a plurality of magnetoresistive elements having a sensing section for sensing a portion of the track and a biasing section magnetostatically coupled to a sensing section of an adjacent element;
    insulating material disposed between each of said elements; and
    first and second conductor means coupled to each element for applying a drive current thereto;
    said first conductor means electrically connected to its associated element to define one end of the sensing section of each element;
    said second conductor means electrically connected to its associated element to define a second end of the sensing section of each element, such that the edge of said second conductors from adjacent elements defining the sensing section is positioned on a dividing line defining the center of the magnetic flux transitions sensed by the adjacent elements such that essentially no dead band remains;
    said drive current through said first and second conductors means and the sensing section of each element inducing a magnetic field to magnetically bias the adjacent biasing section of its adjacent element, said adjacent biasing section in turn producing a back magnetic field that is applied to its inducing sensing section as a linear biasing field for sensing the magnetically recorded information, the magnitude of said biasing field being a function of the magnitude of said drive current.

6. A head assembly as defined in claim 5 wherein said plurality of magnetoresistive elements comprise a pair of elements with one portion of each element being a sensing section and one portion being a biasing section.

7. A head assembly as defined in claim 6 wherein one first conductor means is connected to alternate ends of each of said pair of elements and one second conductor means is connected to the approximate center of each element with the outer edge of both second conductors positioned on a dividing line representing the centerline of the elements.

8. A head assembly as defined in claim 6 wherein one first conductor means is connected to alternate ends of each of said pair of elements and one second conductor means is connected to an opposite end of each of said pair of elements and covers the biasing section of its element such that the inner edge of each second conductor is positioned on a dividing line representing the centerline of the elements.

9. A head assembly as defined in claim 1 wherein each element includes a sensing section connected between said first and second conductors for sensing the magnetically recorded information, and a bias section magnetostatically coupled to its adjacent sensing section of another one of said plurality of elements, said bias section providing said means for biasing said elements wherein said current through the adjacent sensing section induces a magnetic field in its adjacent bias section which in turn back induces the magnetic operating bias for the adjacent sensing section.

* * * * *